United States Patent [19]

Navarre

[11] 3,808,073

[45] Apr. 30, 1974

[54] METHOD OF ASSEMBLING PLASTIC APPARATUS

[76] Inventor: Irving L. Navarre, 344 Rio Vista Ct., Tampa, Fla. 33604

[22] Filed: May 12, 1971

[21] Appl. No.: 142,566

[52] U.S. Cl.................. 156/64, 136/170, 156/244, 156/309, 206/2
[51] Int. Cl. ......................................... G01d 21/00
[58] Field of Search ............ 156/306, 309, 69, 244, 156/64; 161/254; 136/166, 170; 264/324; 260/27 FV; 206/2

[56] References Cited
UNITED STATES PATENTS

| | | | |
|---|---|---|---|
| 3,528,542 | 5/1970 | Miller | 156/69 X |
| 3,698,961 | 10/1972 | Niemann | 156/69 X |
| 2,546,208 | 3/1951 | Barton | 156/69 X |
| 3,577,291 | 5/1971 | Uchida | 156/64 |
| 3,192,091 | 6/1965 | Her et al. | 156/309 X |
| 3,388,639 | 6/1968 | Rumberger | 156/309 X |
| 3,542,619 | 11/1970 | McManus | 156/242 X |
| 3,668,034 | 6/1972 | Nickolas et al. | 156/242 X |
| 3,700,521 | 10/1972 | Gaffney | 156/242 X |
| 3,054,703 | 9/1962 | Brasure | 156/309 X |
| 3,484,300 | 12/1969 | Sundberg | 136/170 X |
| 3,258,369 | 6/1966 | Blaich | 136/170 |
| 3,487,036 | 12/1969 | Bissot | 260/27 EV |

FOREIGN PATENTS OR APPLICATIONS

| | | | |
|---|---|---|---|
| 950,406 | 2/1964 | Great Britain | 260/27 EV |

OTHER PUBLICATIONS

Modern Plastics, Encyclopedia Issue 1967, Vol. 44, No. 1A Sept. 1966, pages 242–243 relied upon.

*Primary Examiner*—Edward G. Whitby
*Attorney, Agent, or Firm* — Morton, Bernard, Brown, Roberts & Sutherland

[57] ABSTRACT

A method of assembling an electric storage battery. A thermoplastic adhesive is utilized which adheres to the battery casing to permit a fluid-tight seal, but which can be melted by heating to permit opening of the seal after it is formed, should such opening be desired. The battery casing and cover and a precisely measured quantity of the thermoplastic adhesive are heated, placed in the assembled position and cooled. Since the adhesive is precisely measured, the proper quantity is utilized to assure a fluid-tight seal while avoiding overflow onto the battery casing or elements. Since the adhesive can be melted by heating, should a defective battery be found, it can be disassembled for reworking without destroying the casing or cover.

14 Claims, 11 Drawing Figures

METHOD OF ASSEMBLING PLASTIC APPARATUS

The present invention pertains to the assembly of polypropylene articles utilizing a thermoplastic adhesive. More particularly, the present invention pertains to an improved method of manufacturing electric storage batteries utilizing an adhesive which after hardening can be softened by heating to permit opening of a seal.

Numerous items are manufactured of polypropylene components held together by adhesive. By way of example, electric storage batteries, such as those utilized in automobiles, are commonly manufactured by assembling the various battery elements within a one-piece, open-topped casing of a material such as polypropylene and having a number of interior walls which separate adjacent cells of the battery. A one-piece cover of polypropylene, rubber or other plastic is then mated with the open top and sealed to the casing to form the complete storage battery. The cover is generally provided with grooves or recesses for receiving the interior and exterior walls of the casing. Adhesive is placed in these recesses to seal the casing and cover together in a fluid-tight relationship. In the assembly of electric storage batteries by this method as practiced heretofore, the adhesive is provided in any of a number of manners. By way of example, U.S. Pat. No. 3,484,300 describes a method in which a softened or liquid adhesive is placed in the recesses prior to the casing and the cover being joined together. After such mating, the adhesive hardens, effecting the desired seal. Use of such liquid adhesive, however, results in difficulty in measuring the precise quantity of adhesive required for the assembly of the battery. Oftentimes, either too little adhesive is provided, with the result that an incomplete seal is made, or too much adhesive is provided, with the result that adhesive flows out of the recesses onto the casing and the cover. Not only does this waste adhesive, but also it mars the appearance of the finished battery, and it leads to the likelihood of adhesive getting on the battery elements and possibly impairing performance. In another battery assembly process, the recesses in the cover are filled with a thixotropic adhesive. Such an adhesive, however, is likewise difficult to measure precisely and thus suffers from the same shortcomings as does a liquid adhesive. U.S. Pat. No. 3,416,970 discloses a battery assembly method in which the casing is inverted and dipped into a tank containing an epoxy resin adhesive mixed with a thickening agent. This dipping process likewise is incapable of providing a precise quantity of adhesive.

Polypropylene articles such as battery casings in the past have generally been assembled with a process utilizing an epoxy resin adhesive which requires the mixing of two components to provide an adhesive that undergoes a chemical change to result in hardening. A number of shortcomings result. The two components must be measured precisely. The mixed adhesive has a short pot life, in the order of about one hour. During the latter part of this pot life, the chemical reaction is underway, and the adhesive increases in temperature. This affects the viscosity of the adhesive, making the measurement of the quantity applied to the polypropylene articles even more difficult. If it becomes necessary to shut down the assembly operation for a brief period, the mixed adhesive is likely to harden before the operation is resumed, and consequently the applicator must be cleaned. In addition, as the end of pot life nears, the adhesive tends to clog the applicator.

The hardening of the adhesive resulting from the mixing of a two-component epoxy resin in an irreversible process. In the assembly of battery casings, for example, a certain number of batteries are not going to function properly, and reworking of them is therefore necessary. Since the adhesive cannot be softened to permit removal of the cover, the battery casing must be destroyed. This results in considerable waste of material.

The present invention is a method of assembling articles of polypropylene, rubber or other plastic such as electric storage batteries utilizing a thermoplastic adhesive and overcoming the several shortcomings of existing methods. In accordance with the present invention, a thermoplastic adhesive material, which is normally solid at room temperature but which melts at increased temperatures, is provided in the precise quantity necessary to form a fluid tight seal between the polypropylene, rubber or other articles. In this specification and the following claims, by "polypropylene article" and "plastic article" is meant an article of polypropylene, rubber or other plastic such as battery casings and the like. While the method of assembly of polypropylene articles of the present invention will be described with reference to the assembly of electric storage batteries, it is likewise applicable to assembly of other polypropylene articles. In a preferred method of assembling batteries in accordance with the present invention, thermoplastic adhesive material is placed into recesses in the battery cover in solid form. The cover, the battery casing, and the adhesive are then heated to a temperature at which the adhesive melts, and the casing and cover are mated together and cooled to solidify the adhesive, with the result that a fluid tight seal is obtained between the casing and the cover. By "melts", it is meant that the normally solid adhesive softens sufficiently to adhere to the casing when the casing and cover are mated. In this condition, the adhesive is capable of flowing slowly, although it may not readily pour. Since the adhesive is applied as a solid, the necessary quantity can be precisely measured. The solid adhesive can be provided, for example, in the form of a gasket or mat which is either cast or extruded. Alternatively, the adhesive can be provided in granular or powder form and accurately metered into the cover recesses. The hardening of the thermoplastic adhesive is a reversible process, and so should a battery be found to be defective after assembly, the cover can be removed simply by heating the assembled battery to a temperature sufficient to melt the thermoplastic adhesive.

These and other aspects and advantages of the present invention are more apparent in the following detailed description and claims, particularly when considered in conjunction with the accompanying drawings in which like parts bear like reference numerals. In the drawings:

Figure 10:
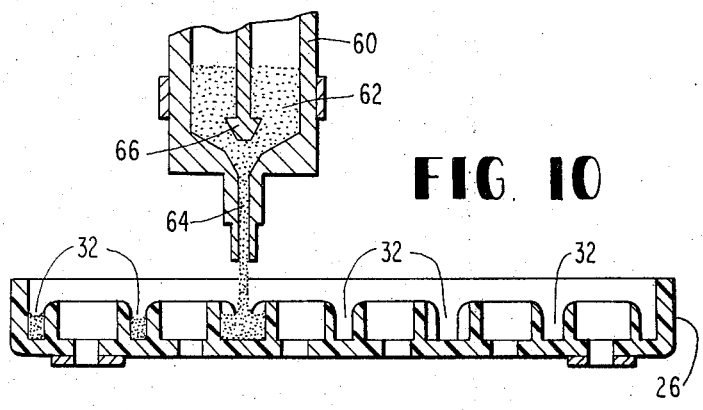
Figure 8:
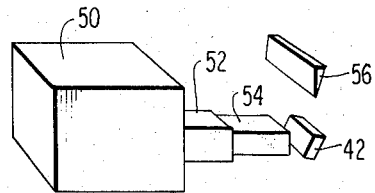
Figure 11:
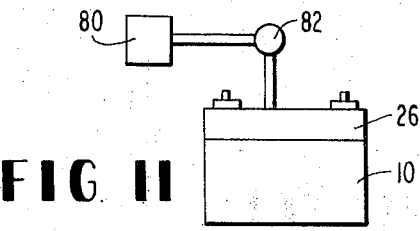
Figure 9:
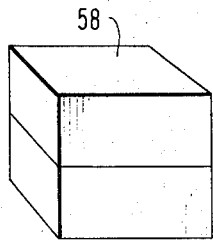

FIGS. 8 and 9 diagrammatically illustrate methods of forming a solid adhesive mat suitable for use in the assembly of batteries in accordance with the process of the present invention;

FIG. 10 depicts an alternative step in the assembly of batteries by a process in accordance with the present invention and utilizing granular solid adhesive material; and FIG. 11 depicts the checking of assembled batteries.

Figure 1:
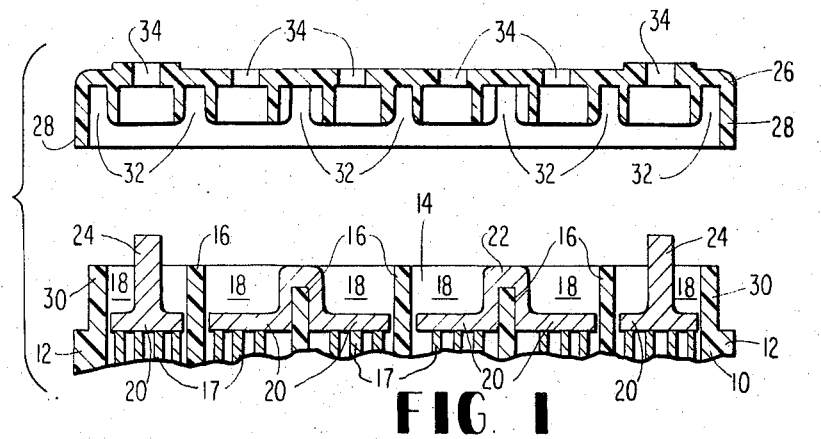
FIG. 1 is a fragmentary vertical cross-sectional view of a battery casing and cover in spaced-apart relationship.
Figure 2:
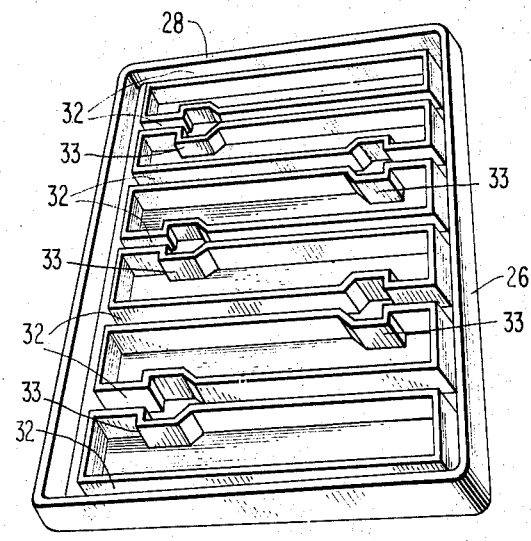
FIG. 2 is a perspective view of a battery cover suitable for assembly to a battery casing in accordance with the present invention.

As depicted in FIGS. 1 and 2, storage battery casing 10 includes side walls 12 and end walls 14, only one of which is depicted, at bottom (not shown), and a plurality of interior walls 16. Casing 10, which preferably is formed of a one-piece construction of, for example, polypropylene, houses the usual battery elements 17. The interior walls 16 of casing 10 are spaced apart in parallel relation to the end walls 12 and define a plurality of cells 18, each of which houses an electrode assembly 20. The electrode assemblies 20 of the interior cells 18 are interconnected into pairs by legs 22 which extend up and over the interior walls 16, as depicted in FIG. 1. The electrode assemblies in the exterior cells 18 are each provided with an electrode terminal 24 adapted to extend through the battery cover to permit external connection of the battery to a load.

Cover 26 is adapted to fit over casing 10 with end walls 28 of cover 26 mating with upper portions 30 of end walls 12. Upper portions 30 and interior walls 16 mate with recesses 32 in the inner surface of cover 26. Cover 26 includes openings 34 providing access to each cell 18. Openings 34 may be closed, for example by means of threaded caps.

Figure 4:
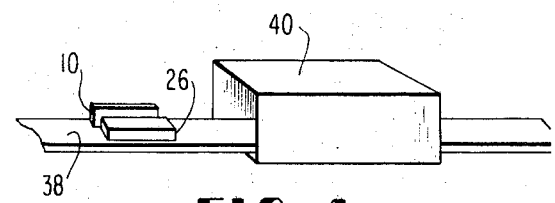
FIGS. 4 and 5 depict steps in the assembly of a battery in accordance with the process of the present invention.
Figure 3:
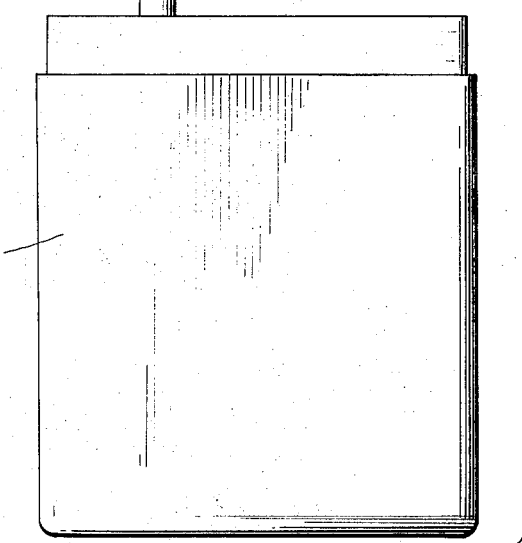
FIG. 3 is an elevational view of the battery casing and cover ready for assembly in accordance with the present invention.
Figure 5:
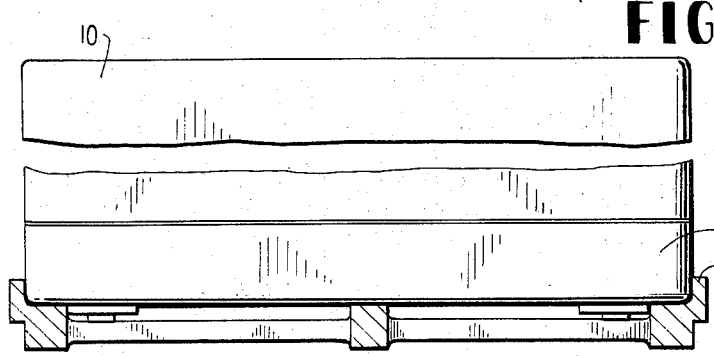
Figure 6:
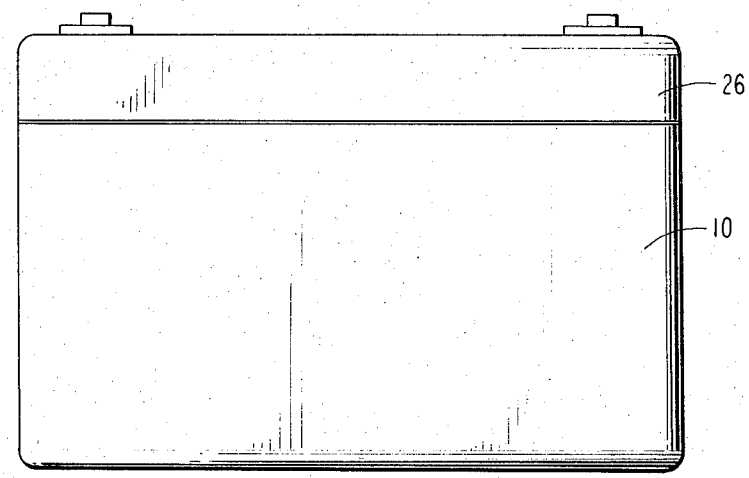
FIG. 6 is an elevational view of a complete battery assembled by the process of the present invention.

In a preferred method of assembling battery casing 10 and cover 26 with a fluid-tight seal in accordance with the assembly process of the present invention, cover 26 is placed upon a pallet 36 as depicted in FIG. 3, and the required quantity of solid adhesive material is placed at those locations at which cover 26 and casing 10 mate; i.e., in recesses 32. Casing 10, cover 26 and the adhesive are then heated, for example as depicted in FIG. 4 by passing on conveyor 38 through oven 40. Within the oven, cover 26, casing 10 and the solid adhesive material are heated to a temperature sufficient to melt the solid adhesive material. Casing 10 is then inverted and placed in position in cover 26 with walls 14, 16, and 30 mating within their respective recesses 32, as depicted in FIG. 5. The casing and cover remain in this inverted position for sufficient time to permit the adhesive to solidify to a set condition. Casing 10, with cover 26 sealed thereto, is then returned to its upright position, as shown in FIG. 6, and allowed to cool further. The assembled casing and cover are then ready for further processing.

Figure 7:
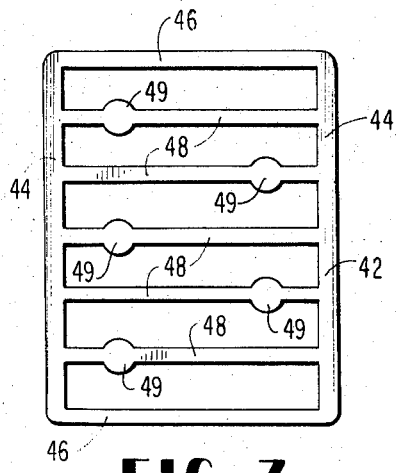
FIG. 7 is a plan view of a solid adhesive mat suitable for use in the assembly of a battery in accordance with the process of the present invention.

FIG. 7 depicts a mat 42 of solid thermoplastic adhesive suitable for use in the present invention. Mat 42 is formed of a design adapted to fit the locations at which cover 26 and casing 10 mate, and thus mat 42 includes side members 44, end members 46, and intermediate members 48 positioned to fit within recesses 32 of cover 26. Mat 42 has a thickness which provides precisely the proper quantity of adhesive for insuring a fluid tight seal between casing 10 and cover 26, while likewise assuring that excess adhesive is not provided which otherwise might overflow and run down walls 12, 14 and 16, marring the appearance of the finished battery.

Mat 42 can be formed in any of several manners. By way of example, FIG. 8 depicts means 50 for heating a quantity of solid thermoplastic adhesive until it has softened to a consistency to pass through die 52 to form an extrusion 54 of adhesive material having the cross section required by mat 42. Cutting means 56 are then utilized to cut mats 42 from extrusion 54. Alternatively, as depicted in FIG. 9, a mold 58 can be utilized to cast mats 42. Injection molding is one preferred method of making mats 42.

FIG. 10 depicts suitable means for providing a solid thermoplastic adhesive to recesses 32 in granular or powder form. Supply hopper 60 holds a quantity of granular thermoplastic adhesive material 62 which passes through outlet 64 under the control of metering means 66. The metering means can be controlled under a program to permit a precise quantity of the granular solid adhesive material to be metered into each recess 32.

The art of formulating and manufacturing solid thermoplastic adhesives is at such an advanced stage that the adhesives utilized in accordance with the present invention could be any of numerous such adhesive formulations, the main requirement being that they be designed specifically for adhesion to the particular substance from which the battery casing and cover are made. It is also a requirement that the temperature at which the adhesives are designed to melt be compatible with the temperature tolerated by the case and cover. By way of example an adhesive could be utilized which comprises a combination of ethylene-vinyl acetate copolymers, preferably the graft copolymer of ethylene onto a vinyl acetate homopolymer, and a glycerol ester of hydrogenated wood rosin. With this adhesive, it is preferred to heat mat 42 within oven 40 to a temperature in the range of 170°F. to 270°F., and preferably 220°F.; to heat cover 26 to a temperature in the range of 180°F. to 280°F., and preferably 230°F.; to heat electrode connectors 22 to a temperature in the range of 170°F. to 270°F., and preferably 220°F.; and to heat walls 14, 16, and 30 of casing 10 to a temperature in the range of 180°F. to 280°F., and preferably 220°F. This can be achieved, for example, by controlling the temperature of oven 40 to be in the range of 200°F. to 300°F. and preferably 250°F. and by controlling the speed of conveyor 38 so that casing 10 and cover 26 pass through oven 40 in from 12 to 16 minutes and preferably 14 minutes. Once this heating has been achieved and casing 10 is inverted and mated with cover 26, it is preferably left in this inverted position for from 3 to 9 minutes and preferably 6 minutes to permit the adhesive to achieve its set condition. The weight of casing 10 with the battery elements therein helps to assure that the proper seal is attained. Once the adhesive is set and the battery is returned to its upright position, it is preferably cooled from 10 to 35 minutes and preferably 25 minutes, although this cooling time may be shortened by passing an air-water spray over the united cover and casing. After the cover and casing have cooled to a temperature in the range from 80°F. to 110°F. and preferably 95°F., the seal can be checked for a fluid-tight fit as indicated in FIG. 11 by introducing air from a source 80 through a valve and gage 82 into each of the cells 18 to a pressure of from 1 p.s.i. to 5 p.s.i. and preferably 2 p.s.i.

Should a finished battery be found to be defective, it can be disassembled by first applying heat to melt the adhesive to open the seal. This can be achieved, for example, by placing the battery in oven 40 for up to five minutes and preferably for three minutes. Cover 26 can then be removed from casing 10 to permit correction of the defect, and the battery can be resealed utilizing the process of the present invention, thus eliminating the wasting of casings and covers of defective batteries.

Although the present invention has been described with reference to preferred embodiments, numerous changes would be made, and still the result would come within the present invention. Thus, as one example, a solid thermoplastic adhesive material could be provided in the form of a rope to be cut to th required length and placed in recesses 32.

What is claimed is:

1. A method of assembling an electric storage battery from a plastic cover, having a plurality of recesses therein, and a plastic casing, having battery components therein and so having substantial weight particularly relative to the cover, to provide a fluid-tight seal between the casing and the cover which seal is capable of being opened while leaving the casing and cover free from damage, said method comprising in sequence the steps of:
   a. determining the contour of the plurality of recesses in the cover at which the cover is to mate with the casing;
   b. forming a solid thermoplastic adhesive mat to substantially conform to the contour of the plurality of recesses in the cover;
   c. placing the solid thermoplastic adhesive mat in the recesses of the cover;
   d. heating the casing, the cover and the thermoplastic adhesive mat to a temperature sufficient to melt the thermoplastic adhesive mat to provide melted adhesive while retaining the melted adhesive within the cover recesses;
   e. inverting the casing;
   f. mating the casing and cover with the casing on top of the cover to cause the weight of the casing to aid in the mating;
   g. cooling the mated casing and cover to solidify the thermoplastic adhesive;
   h. re-inverting the mated casing and cover to place the assembled battery in an upright position; and
   i. introducing air into the cooled, assembled battery at a pressure sufficient to check the seal for fluid-tight fit.

2. A method as claimed in claim 1 in which the mat is formed by extruding thermoplastic adhesive material to form an extrusion and cutting the extrusion to form the mat.

3. A method as claimed in claim 1 in which the mat is formed by casting thermoplastic adhesive material.

4. A method as claimed in claim 1 in which the mat is formed by injection molding thermoplastic adhesive material.

5. A method as claimed in claim 1 in which the air is introduced to a pressure of from about 1 pound per square inch to about 5 pounds per square inch.

6. A method as claimed in claim 5 in which the air is introduced to a pressure of about 3 pounds per square inch.

7. A method as claimed in claim 1 in which the thermoplastic adhesive mat is heated by passing the cover with the thermoplastic adhesive mat thereon and the casing through an oven.

8. A method as claimed in claim 1 in which the thermoplastic adhesive mat is a combination of ethylene-vinyl acetate copolymer and a glycerol ester of hydrogenated wood rosin.

9. A method as claimed in claim 8 in which the thermoplastic adhesive mat is heated to a temperature of from about 170°F. to about 270°F.

10. A method as claimed in claim 9 in which the thermoplastic adhesive mat is heated to a temperature of about 220°F.

11. A method as claimed in claim 1 further comprising reheating the thermoplastic adhesive to a temperature sufficient to melt the thermoplastic adhesive to open the seal, and removing the cover from the casing article to permit correction of defects.

12. A method as claimed in claim 1 in which the cover and casing are each polypropylene components.

13. A method of assembling an electrical storage battery from a plastic cover, having a plurality of recesses therein, and a plastic casing, having battery components therein and so having substantial weight particularly relative to the cover, to provide a fluid-tight seal between the casing and the cover which seal is capable of being opened while leaving the casing and cover free from damage, said method comprising in sequence the steps of:
   a. metering granular thermoplastic adhesive material from a supply hopper into the recesses of the cover at locations at which the cover is to mate with the casing;
   b. heating the casing, the cover and the thermoplastic adhesive mat to a temperature sufficient to melt the thermoplastic adhesive mat to provide melted adhesive while retaining the melted adhesive within the cover recesses;
   c. inverting the casing;
   d. mating the casing and cover with the casing on top of the cover to cause the weight of the casing to aid in the mating;
   e. cooling the mated casing and cover to solidify the thermoplastic adhesive;
   f. re-inverting the mated casing and cover to place the assembled battery in an upright position; and
   g. introducing air into the cooled, assembled battery at a pressure sufficient to check the seal for fluid-tight fit.

14. A method of assembling an electric storage battery from a plastic cover, having a plurality of recesses therein, and a plastic casing, having battery components therein, to provide a fluid-tight seal between the casing and the cover which seal is capable of being opened while leaving the casing and cover free from damage, said method comprising in sequence the steps of:

a. determining the contour of the plurality of recesses in the cover at which the cover is to mate with the casing;
b. forming a solid thermoplastic adhesive mat to substantially conform to the contour of the plurality of recesses in the cover;
c. placing the solid thermoplastic adhesive mat in the recesses of the cover;
d. heating the casing, the cover and the thermoplastic adhesive mat to a temperature sufficient to melt the thermoplastic adhesive mat to provide melted adhesive while retaining the melted adhesive within the cover recesses;
e. mating the casing and cover; and
f. cooling the melted casing and cover to solidify the thermoplastic adhesive.

* * * * *

UNITED STATES PATENT OFFICE
CERTIFICATE OF CORRECTION

Patent No. 3,808,073  Dated April 30, 1974

Inventor(s) IRVING NAVARRE

It is certified that error appears in the above-identified patent and that said Letters Patent are hereby corrected as shown below:

Column 5, line 18, the word "would" should be changed to --could--.

, line 21, the word "th" should be changed to --the--.

Column 8, line 6, the word "melted" should be changed to --mated--.

Signed and sealed this 10th day of September 1974.

(SEAL)
Attest:

McCOY M. GIBSON, JR.
Attesting Officer

C. MARSHALL DANN
Commissioner of Patents